(12) United States Patent
Toriumi

(10) Patent No.: US 11,350,028 B2
(45) Date of Patent: May 31, 2022

(54) ELECTRONIC APPARATUS WITH DETERMINING ZOOM CHANGING DIRECTION BASED ON CURRENT POSITION

(71) Applicant: CANON KABUSHIKI KAISHA, Tokyo (JP)

(72) Inventor: Hiroshi Toriumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/023,419

(22) Filed: Sep. 17, 2020

(65) Prior Publication Data

US 2021/0099636 A1    Apr. 1, 2021

(30) Foreign Application Priority Data

Sep. 27, 2019  (JP) .............................. JP2019-176707

(51) Int. Cl.
*H04N 5/232*    (2006.01)

(52) U.S. Cl.
CPC ..... *H04N 5/23216* (2013.01); *H04N 5/23212* (2013.01); *H04N 5/23296* (2013.01); *H04N 5/232939* (2018.08)

(58) Field of Classification Search
None
See application file for complete search history.

(56) References Cited

U.S. PATENT DOCUMENTS

| 10,719,216 | B2 | 7/2020 | Tokiwa et al. | |
|---|---|---|---|---|
| 2009/0096879 | A1* | 4/2009 | Motomura | H04N 5/23248 348/208.6 |
| 2010/0208122 | A1* | 8/2010 | Yumiki | G02B 7/021 348/333.08 |
| 2012/0062692 | A1* | 3/2012 | Tsubusaki | H04N 5/23216 348/36 |
| 2018/0150211 | A1* | 5/2018 | Huang | G06F 3/04847 |
| 2018/0220062 | A1* | 8/2018 | Funatsu | H04N 5/23212 |
| 2019/0121525 | A1* | 4/2019 | Tokiwa | G06F 3/0487 |
| 2020/0014832 | A1* | 1/2020 | Kunishige | H04N 5/232 |

FOREIGN PATENT DOCUMENTS

| JP | 2003-167184 A | 6/2003 |
|---|---|---|
| JP | 2005-229145 A | 8/2005 |
| WO | 2018/003390 A1 | 1/2018 |

* cited by examiner

*Primary Examiner* — James M Hannett
*Assistant Examiner* — Wesley J Chiu
(74) *Attorney, Agent, or Firm* — Venable LLP

(57) ABSTRACT

An electronic apparatus configured to change into a plurality of states includes an operation member configured to change the electronic apparatus to one of the plurality of states, an acquirer configured to acquire a state change of the electronic apparatus that occurs when the operation member is operated, based on a current state of the electronic apparatus before the operation member is operated, and a notice controller configured to control notice of information corresponding to the state change acquired by the acquirer.

5 Claims, 7 Drawing Sheets

ELECTRONIC APPARATUS WITH DETERMINING ZOOM CHANGING DIRECTION BASED ON CURRENT POSITION

BACKGROUND OF THE INVENTION

Field of the Invention

The present invention relates to an electronic apparatus.

Description of the Related Art

Electronic apparatuses have conventionally been known which can change into a plurality of states in accordance with an operation on an operation member. Japanese Patent Laid-Open No. ("JP") 2003-167184 discloses a camera that includes a telephoto switch and a wide-angle switch to be operated so as to change a focal length of an imaging optical system to a telephoto side and a wide-angle side, and can change a current focal length to a desired focal length.

However, how the state of the electronic apparatus changes cannot be determined if there is only one operation member that changes the state of the electronic apparatus. For example, the camera disclosed in JP 2003-167184 having a single operation member for changing the focal length instead of the telephoto switch and the wide-angle switch cannot determine whether the focal length becomes smaller or larger when the operation member is operated.

SUMMARY OF THE INVENTION

The present invention provides a more user-friendly electronic apparatus.

An electronic apparatus according to one aspect of the present invention is configured to change into a plurality of states and includes an operation member configured to change the electronic apparatus to one of the plurality of states, and at least one processor which function as: an acquirer configured to acquire a state change of the electronic apparatus that occurs when the operation member is operated, based on a current state of the electronic apparatus before the operation member is operated, and a notice controller configured to control notice of information corresponding to the state change acquired by the acquirer.

Further features of the present invention will become apparent from the following description of exemplary embodiments with reference to the attached drawings.

DESCRIPTION OF THE EMBODIMENTS

Figure 1A:
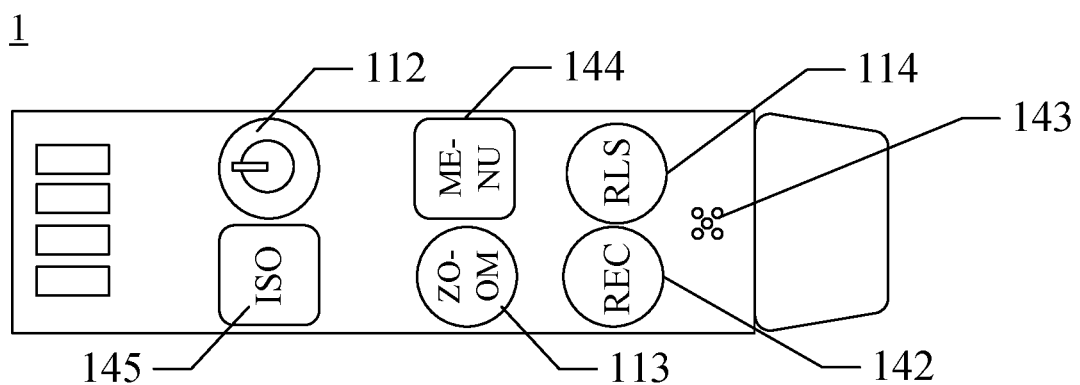
FIGS. 1A and 1B are external views of an image pickup apparatus as an illustrative electronic apparatus according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

Figure 1B:
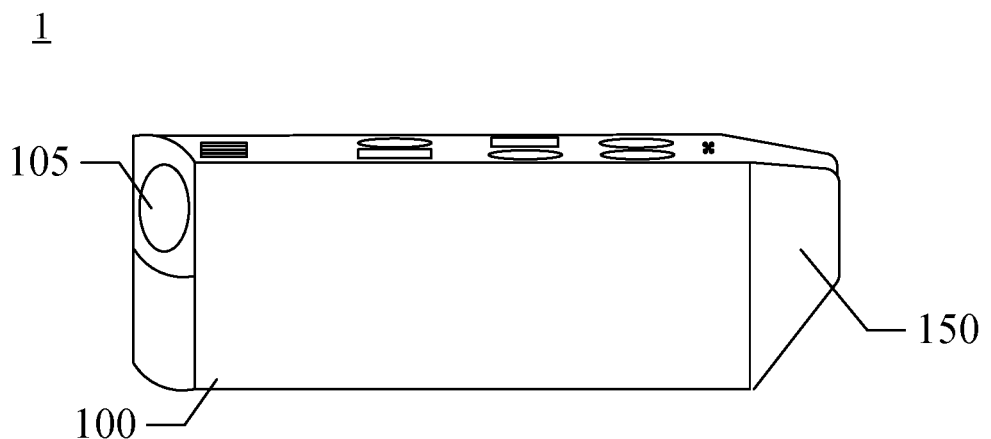
Figure 2:
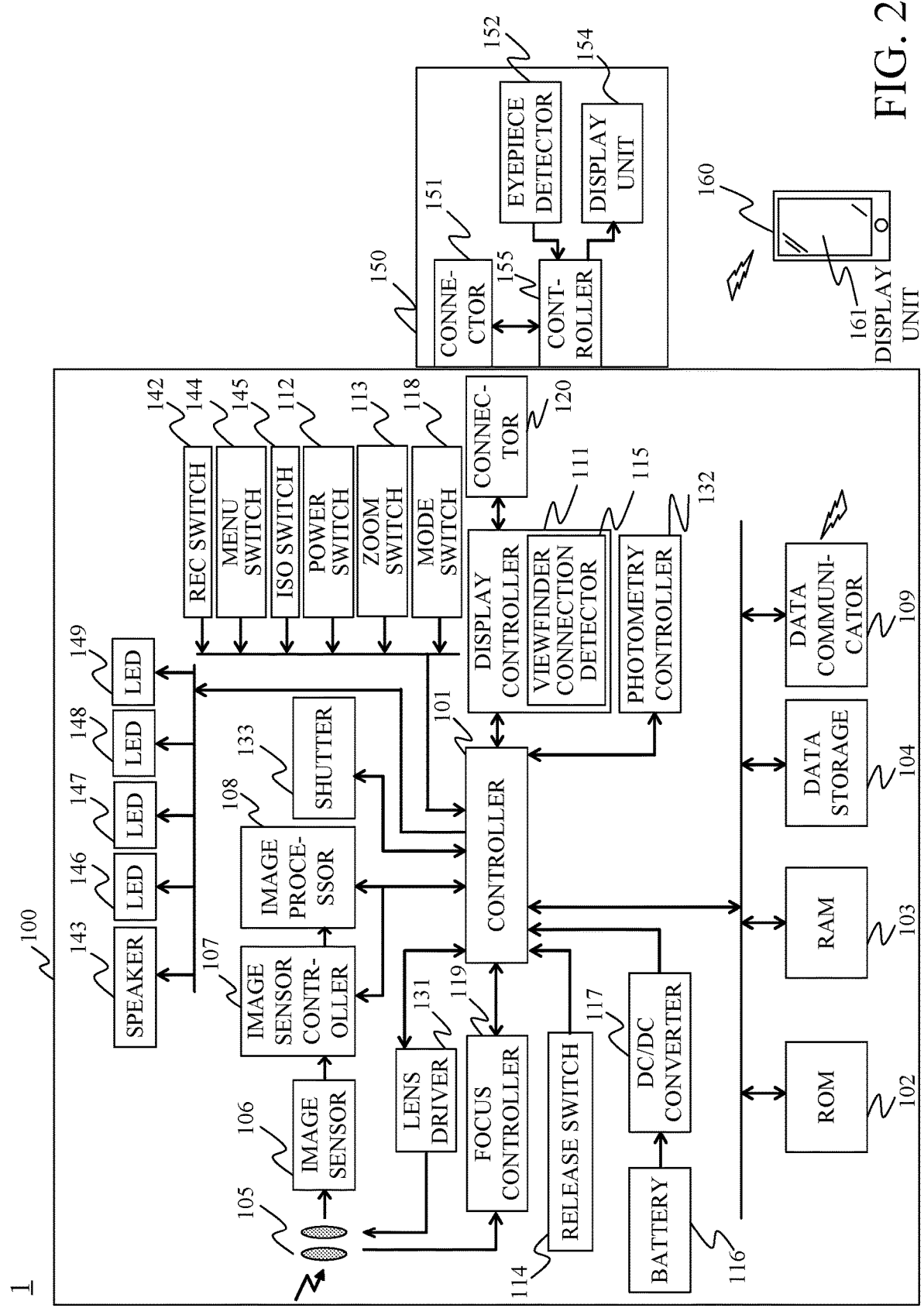
FIG. 2 illustrates an internal configuration of the electronic apparatus.

FIGS. 1A and 1B are external views of an image pickup apparatus 1 as an illustrative electronic apparatus according to an embodiment of the present invention. FIG. 1A is a top view of an image pickup apparatus 1. FIG. 1B illustrates the image pickup apparatus 1 viewed from the side. FIG. 2 illustrates an internal configuration of the image pickup apparatus 1.

The image pickup apparatus 1 includes a body 100 and an electronic viewfinder 150. The body 100 and the electronic viewfinder 150 are connected via connectors 120 and 151.

The body 100 has an imager including an imaging optical system 105, an image sensor 106, an image sensor controller 107, a release switch 114, a focus controller 119, a lens driver 131, a photometry controller 132, and a shutter 133.

The imaging optical system 105 forms an image of object light on the image sensor 106 such as a CMOS sensor. Although the imaging optical system 105 includes two lenses in FIG. 2, the number of lenses is not limited to two.

When the user presses the release switch 114, the light amount of the object light condensed by the imaging optical system 105 is controlled by the shutter 133, and the image sensor 106 performs photoelectric conversion processing for it and generate an object image. Thereafter, an image processor 108 performs video signal processing, and displays a captured image on the display unit 154 of the electronic viewfinder 150. The shutter 133 may be a focal plane shutter or a lens shutter, or an electronic shutter that electronically controls the light amount taken into the image sensor 106. The display unit 154 is, for example, a small LCD or an organic EL display, and notifies the user of the state of the body 100.

The controller 101 is connected to a ROM (Read Only Memory) 102 and a RAM (Random Access Memory) 103 that store control programs.

The controller 101 performs various controls based on the control program stored in the ROM 102. For example, the controller 101 reads a captured image (video) signal output from the image processor 108 and transfers it to the RAM 103. The controller 101 also transfers data from the RAM 103 to the display controller 111, compresses image data and motion image data, and stores them in a data storage 104. The controller 101 also instructs the image sensor 106, the image sensor controller 107, the image processor 108, and the display controller 111 to change a data taking range and digital image processing. The controller 101 instructs an imaging operation accompanying the operation of the release switch 114 and power supply to each component through a DC/DC converter 117.

The controller 101 acquires a luminance signal generated in the pixel on the image sensor 106 and taken in by the photometric controller 132, and A/D-converts the acquired luminance signal into an 8-bit digital signal. At this time, the controller 101 corrects the F-number (effective F-number) indicating the brightness of the imaging optical system 105, corrects variations in the output signal from the image sensor 106 (controls the level and gain), and performs a photometric correction based on information from the imaging optical system 105. Thereby, the controller 101 acquires a field luminance signal value, and optimally controls the shutter speed and the aperture stop (diaphragm) in the imaging optical system 105 based on the acquired field luminance signal value, performing the optimum exposure.

The controller 101 can detect the object and distinguish an imaging scene using the luminance signal and color signal of each area when the object image from the image sensor 106 is divided into a plurality of areas.

The RAM 103 has an image unfolding area, a work area, a VRAM, and a temporary refuge area. The image unfolding area is used as a temporary buffer that temporarily stores the captured image (YUV digital signal) sent from the image processor 108 and the JPEG compressed image data read out of the data storage 104. The image unfolding area is used as an image dedicated work area for image compression processing and decompression processing. The work area is used for various programs. The VRAM is used to store the display data to be displayed on the display unit 154.

The data storage 104 is a flash memory for storing the image data and motion image data compressed by the controller 101 in a file format.

The image sensor 106 can output thinned pixel data in the horizontal and vertical directions in accordance with a resolution conversion instruction from the controller 101.

The image sensor controller 107 has a timing generator for supplying a transfer clock signal and a shutter signal to the image sensor 106, and a circuit for performing noise removals and gain processing for the output signal from the image sensor 106. The image sensor controller 107 further has an A/D conversion circuit for converting an analog signal, for example, into a 10-bit digital signal. The 10-bit digital signal corresponds to the number of video information acquisition quantization bits. The number of bits can be variously changed according to the specification of the image sensor 106 and the like. The image sensor controller 107 further has a circuit for performing pixel thinning processing in accordance with the resolution conversion instruction from the controller 101 for displays on the display unit 154 and motion image capturing.

The image processor 108 performs image processing, such as a gamma conversion, a color space conversion, a white balance adjustment, AE, and a flash correction, for the 10-bit digital signal output from the image sensor controller 107. The image processor 108 outputs an 8-bit digital signal in YUV (4:2:2) format.

The display controller 111 receives the YUV digital image data transferred from the image processor 108 or the YUV digital image data obtained by JPEG-decompressing the image file from the data storage 104. The display controller 111 converts the received image data into an RGB digital signal and then displays it on the display unit 154.

The display controller 111 has a viewfinder connection detector 115. The viewfinder connection detector 115 detects whether the electronic viewfinder 150 is connected to the body 100.

The focus controller 119 can detect focus positions of a plurality of areas on the imaging plane using a focus position detecting method such as contrast AF (peak searching AF). The controller 101 uses the information from the focus controller 119 to calculate the lens driving amount. The lens driver 131 performs a focusing operation by driving the specific lens in the imaging optical system 105 along the optical axis of the imaging optical system 105 according to the lens driving amount acquired from the controller 101. Although the lens is driven for focusing in this embodiment, the image sensor 106 may be driven along the optical axis of the imaging optical system 105. Although this embodiment uses the contrast AF as the focus position detecting method, the phase difference AF may be used.

A data communicator 109 can communicate with an external device 160 having a display unit 161, such as a smartphone, by the wire or wireless communication. The user can capture an image through the external device 160 while checking the image obtained by the image pickup apparatus 1, on the display unit 161. In other words, the user can remotely control the image pickup apparatus 1.

A power switch 112 is an operation member for turning on and off the power of the image pickup apparatus 1.

A zoom switch 113 is an operation member for changing an optical zoom magnification (focal length) of the imaging optical system 105. The lens driver 131 changes the optical zoom magnification by driving the imaging optical system 105 using the signal from the zoom switch 113. In this embodiment, one zoom switch 113 realizes two functions of increasing and decreasing the optical zoom magnification.

The release switch 114 is used to instruct the start of the imaging operation. The release switch 114 has two-stage switch positions depending on the pressure of a release button which is an unillustrated camera operating member. The detection of the first stage position (SW1 ON) locks the camera settings such as the white balance and photometry. When the second stage position (SW2 ON) is detected, the image signal capturing operation is performed.

A battery 116 is a rechargeable secondary battery or a non-rechargeable primary battery. The DC/DC converter 117 is supplied with power from the battery 116 and performs boosting and regulation. This configuration can generate a plurality of power supplies and supply a power supply of a necessary voltage to each component such as the controller 101. The DC/DC converter 117 controls the start and stop of the voltage supply to each component according to the control signal from the controller 101. In this embodiment, the DC/DC converter 117 is supplied with power from the battery 116, but may be supplied with power from another power supply device.

A mode switch 118 is an operation member for switching the mode of the image pickup apparatus 1. The controller 101 switches the mode using the signal from the mode switch 118.

A REC switch 142 is an operation member for allowing the user to operate the start and end of recording of motion image capturing, separately from the release switch 114.

A speaker 143 outputs the sound of the motion image and notifies the operation state of the image pickup apparatus 1 with a buzzer sound. The speaker 143 may notify the zoom state, such as a zoom magnification and a focal length, with a voice.

A MENU switch 144 is an operation member that causes the display unit 154 to display a menu for various settings of the image pickup apparatus 1.

An ISO switch 145 is an operation member for setting the ISO speed of the image pickup apparatus 1.

LEDs 146, 147, 148, and 149 light up or blink to notify the user of the operation state of the image pickup apparatus 1. As will be described later, the transition direction of the focal length may be notified by the blinking period or non-lighting of the LEDs 146, 147, 148, and 149.

An eyepiece detector 152 detects an eyepiece of the user onto the electronic viewfinder 150.

The controller 155 is connected to a connector 151, an eyepiece detector 152, and the display unit 154, and controls the entire electronic viewfinder 150.

Figure 3:
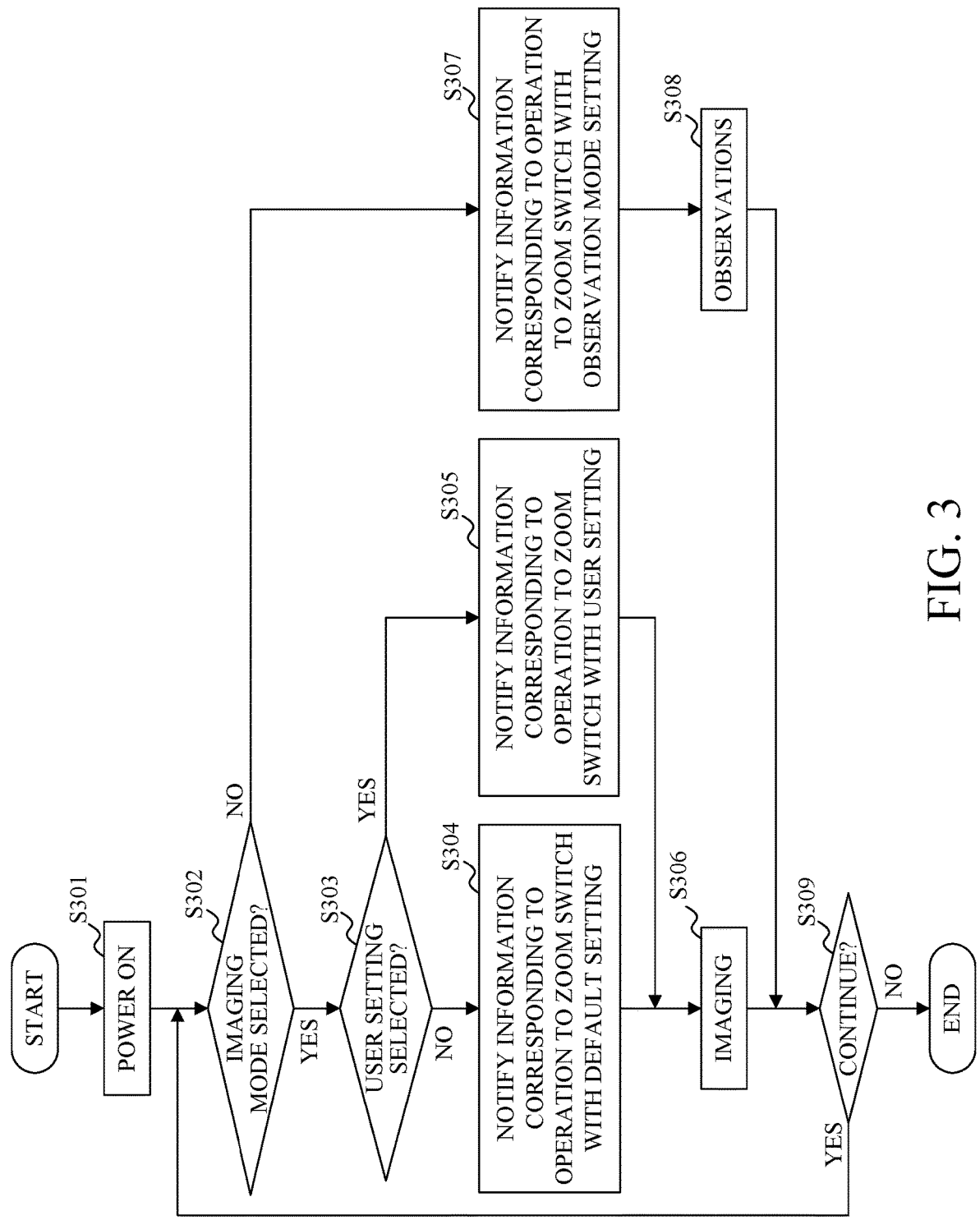
FIG. 3 is a flowchart showing a method of notifying information corresponding to an operation to a zoom switch.

FIG. 3 is a flowchart showing a method of notifying the information corresponding to the operation on the zoom switch 113 when the user looks through the electronic viewfinder 150 for imaging or observations. In this embodiment, "observation" refers to viewing the object viewing the electronic viewfinder 150 without an imaging operation.

The flow in FIG. 3 starts when the controller 101 detects that the power switch 112 is pressed by the user.

In the step S301, the controller 101 supplies the power to each component in the image pickup apparatus 1 via the DC/DC converter 117.

In the step S302, the controller 101 detects whether the user has selected the imaging mode using the mode switch 118. If the imaging mode has been selected, the flow proceeds to the step S303, and if the imaging mode has not yet been selected, the flow proceeds to the step S307.

In the step S303, the controller 101 detects whether or not the user setting has been selected by the user using the MENU switch 144 or the like as the setting relating to the notice of the information corresponding to the operation on the zoom switch. When the user setting has been selected, the flow proceeds to the step S305, and when the user setting has not yet been selected or when the default setting has been selected, the flow proceeds to the step S304.

In the step S304, the controller 101 notifies the information corresponding to the operation on the zoom switch 113 by the default setting or the information indicating a change in zoom state that occurs when the operation is made (the information indicating the changing direction and the changed state). In the default setting, when the zoom switch 113 is clicked or pressed for a short time (pressed for a time shorter than a predetermined time), the zoom position of the imaging optical system 105 moves to the telephoto side by one position. When the zoom switch 113 is held down or pressed for a long time (for a time longer than the predetermined time), the zoom position of the imaging optical system 105 moves to the telephoto end. When the zoom switch 113 is double-clicked or pressed twice within a predetermined time interval, the zoom position of the imaging optical system 105 moves to the wide angle side by one position. When the zoom switch 113 is pressed for a short time when the focal length is at the telephoto end, the zoom position of the imaging optical system 105 moves to the wide-angle end. These settings are not reset even after a predetermined time passes.

A description will be given of the notice of the information corresponding to the operation on the zoom switch 113 in the step S304. FIGS. 4A to 4F explain a method of notifying the information corresponding to the operation on the zoom switch 113 using the display unit 154 before the operation is made. In this embodiment, the imaging optical system 105 takes four zoom positions (a wide-angle end, a telephoto end, and two positions between the wide-angle end and the telephoto end). In other words, this embodiment can set the focal length of the image pickup apparatus 1 to four positions. More specifically, when the zoom position of the imaging optical system 105 is located at the wide-angle end and the telephoto end, the focal lengths are 100 mm and 800 mm, respectively. When the zoom position of the imaging optical system 105 is two positions between the wide-angle end and the telephoto end, the focal lengths are 200 mm and 400 mm, respectively.

Figure 4A:
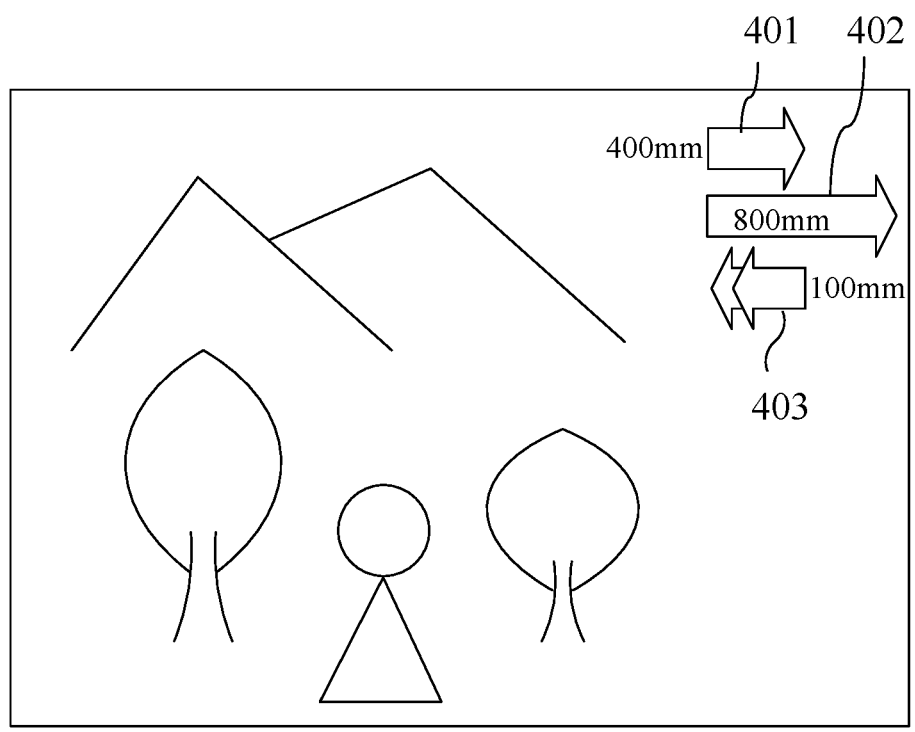
FIGS. 4A to 4F explain a method of notifying the information corresponding to the operation to the zoom switch using a display unit.

FIG. 4A illustrates an illustrative notice displayed on the display unit 154 when the current focal length is 200 mm. When the zoom switch 113 is clicked pressed for a short time, the zoom position of the imaging optical system 105 moves to the telephoto side by one position. Then, the display unit 154 displays a display 401 using a short arrow labelled with 400 mm as the changed focal length of the zoom state caused by the operation to the zoom switch 113. When the zoom switch 113 is held down or pressed for a long time, the zoom position of the imaging optical system 105 moves to the telephoto end. Then, the display unit 154 displays a display 402 using a long arrow labelled with 800 mm as the changed focal length of the zoom state caused by the operation to the zoom switch 113. When the zoom switch 113 is double-clicked or pressed twice, the zoom position of the imaging optical system 105 moves to the wide-angle side by one position. At this time, the display unit 154 displays a display 403 using two short piled arrows labelled with 100 mm as the changed focal length of the zoom state caused by the operation on the zoom switch 113.

Figure 4B:
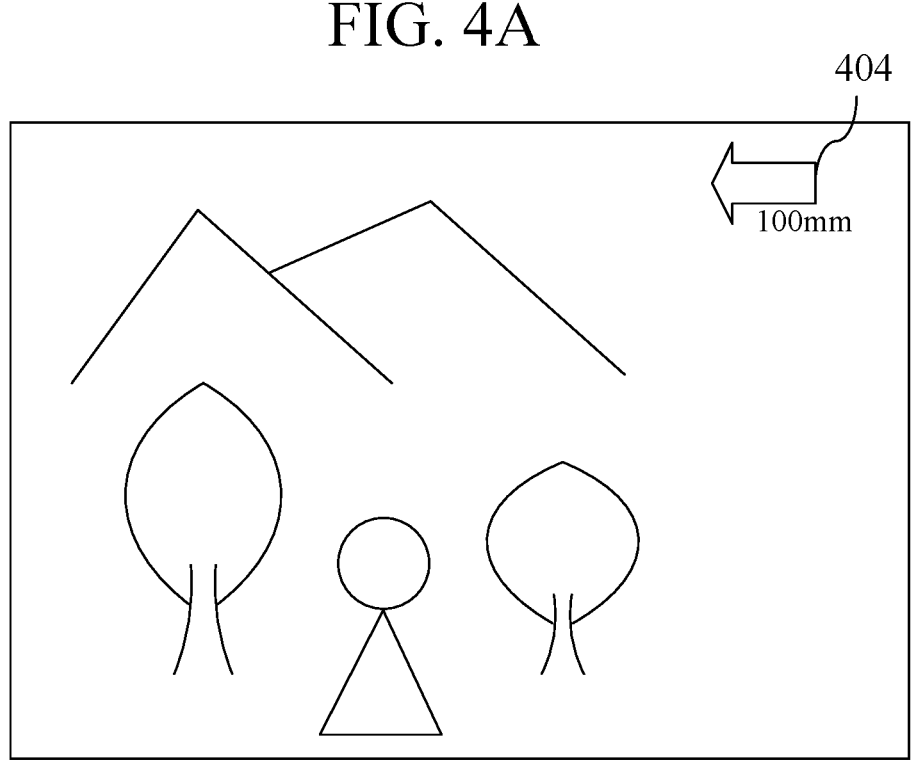

FIG. 4B illustrates an illustrative notice displayed on the display unit 154 when the current focal length is 800 mm. When the zoom switch 113 is pressed for a short time, the zoom position of the imaging optical system 105 moves to the wide-angle end. At this time, the display unit 154 displays a display 404 using a short arrow labelled with 100 mm as the changed focal length of the zoom state caused by the operation to the zoom switch 113. In other words, even if the same operation is made for the zoom switch 113, the zoom position changing direction may differ depending on the current zoom position (current state).

In the step S305, the controller 101 notifies the information corresponding to the operation to the zoom switch 113 by user setting. In the user setting set here, when the zoom switch 113 is pressed for a short time, the zoom position of the imaging optical system 105 moves to the telephoto side by one position. When the zoom switch 113 is pressed for a long time, the zoom position of the imaging optical system 105 moves to the telephoto end. When the zoom switch 113 is pressed twice, the zoom position of the imaging optical system 105 moves to the wide angle side by one position. When the zoom switch 113 is pressed for a short time when the focal length is at the telephoto end, the zoom position of the imaging optical system 105 moves to the wide-angle side by one position. These settings are reset after a predetermined time elapses. Although the number of user settings is one in this embodiment, there are a plurality of selectable user settings.

The notice of the information corresponding to the operation to the zoom switch 113 in the step S305 will be described below.

Figure 4C:
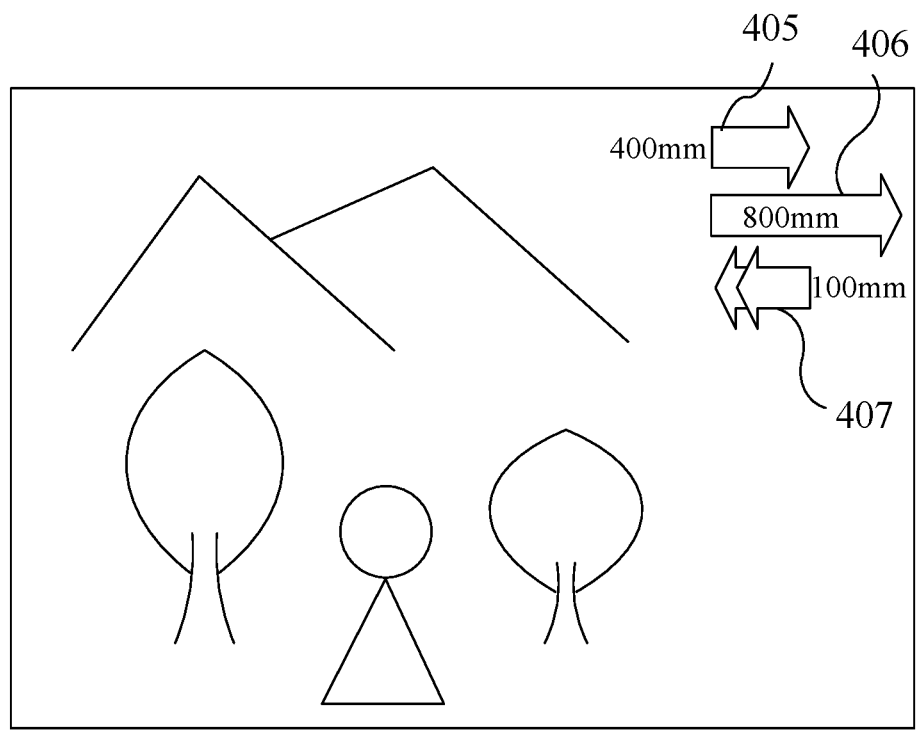

FIG. 4C illustrates an illustrative notice displayed on the display unit 154 when the current focal length is 200 mm. When the zoom switch 113 is pressed for a short time, the zoom position of the imaging optical system 105 moves to the telephoto side by one position. Then, the display unit 154 displays a display 405 using a short arrow labelled with 400 mm as the changed focal length of the zoom state caused by the operation to the zoom switch 113. When the zoom switch 113 is pressed for a long time, the zoom position of the imaging optical system 105 moves to the telephoto end. At this time, the display unit 154 displays a display 406 using a long arrow labelled with 800 mm as the changed focal length of the zoom state caused by the operation to the zoom switch 113. When the zoom switch 113 is pressed twice, the zoom position of the imaging optical system 105 moves to the wide-angle side by one position. At this time, the display unit 154 displays a display 407 using two short piled arrows labelled with 100 mm as the changed focal length of the zoom state caused by the operation to the zoom switch 113.

Figure 4D:
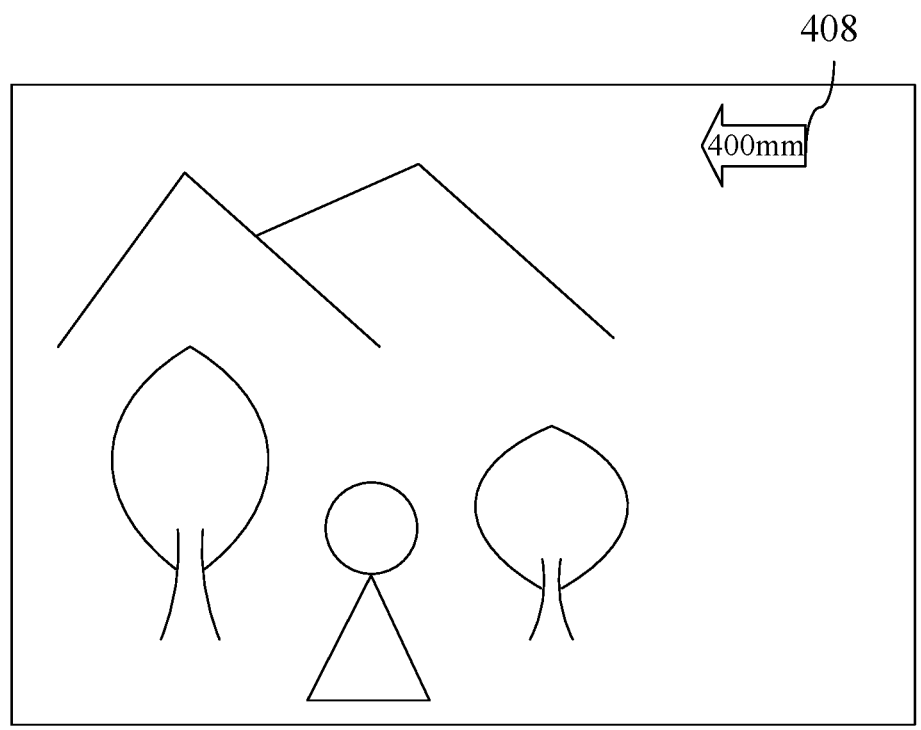

FIG. 4D illustrates an illustrative notice displayed on the display unit 154 when the current focal length is 800 mm. When the zoom switch 113 is pressed for a short time, the zoom position of the imaging optical system 105 moves to the wide-angle side by one position. Then, the display unit 154 displays a display 408 using a short arrow labelled with 400 mm as the changed focal length of the zoom state caused by the operation to the zoom switch 113. Then, a short arrow displayed on the display unit 154 represents the information that is determined by the controller 101 based on the current zoom position (focal length) and corresponds to the change of the zoom position when the zoom switch 113 is operated. Even if the same operation is made for the zoom switch, the zoom position changing direction changes according to the current zoom position. Therefore, the controller 101 acquires a direction in which the zoom position changes when the zoom switch 113 is operated (or information on one of zoom-in and zoom-out which is executed) based on the current zoom position, and determines the information to be displayed based on the acquired changing direction.

In the step S306, the controller 101 sets the focal length to the focal length determined in the steps S304 or S305. The user captures an image at the set focal length.

In the step S307, the controller 101 notifies the information corresponding to the operation to the zoom switch 113 in the observation mode setting. In the observation mode setting, when the zoom switch 113 is pressed for a short time, the zoom position of the imaging optical system 105 moves to the telephoto end. When the zoom switch 113 is pressed for a long time, the zoom position of the imaging optical system 105 moves to the telephoto side by one position. When the zoom switch 113 is pressed twice, the zoom position of the imaging optical system 105 does not move. When the focal length is at the telephoto end, and when the zoom switch 113 is pressed for a short time, the zoom position of the imaging optical system 105 moves to the wide-angle end, and when the zoom switch 113 is pressed for a long time, the zoom position of the imaging optical system 105 moves to the wide-angle side only by one position. These settings are not reset even after the predetermined time lapses.

A description will now be given of the notice of the information corresponding to the operation to the zoom switch 113 in the step S307.

Figure 4E:
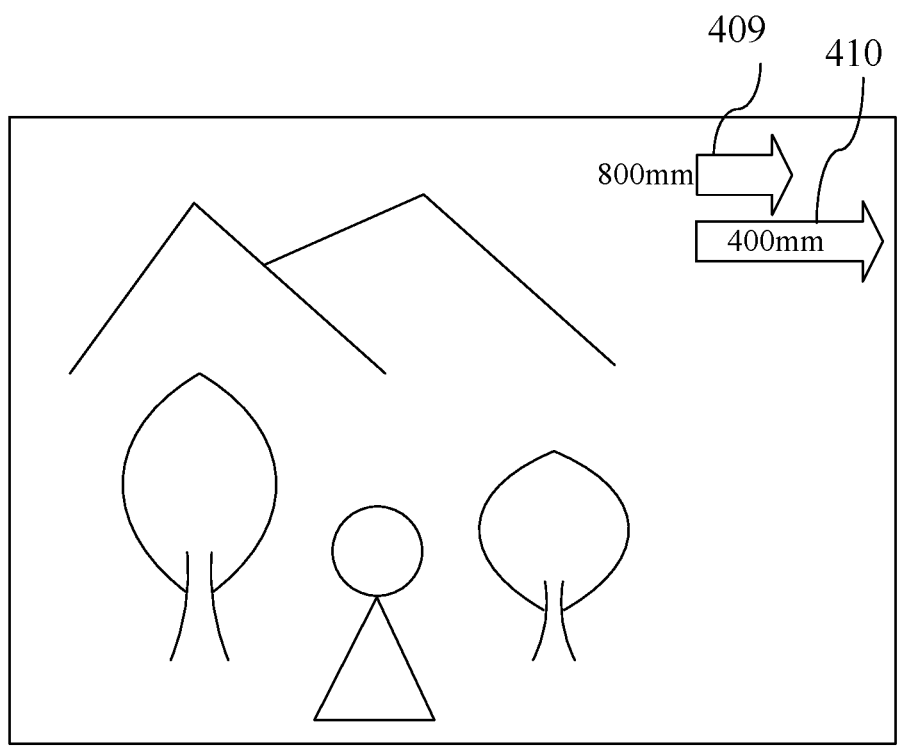

FIG. 4E illustrates an illustrative notice displayed on the display unit 154 when the current focal length is 200 mm. When the zoom switch 113 is pressed for a short time, the zoom position of the imaging optical system 105 moves to the telephoto end. At this time, the display unit 154 displays a display 409 using a short arrow labelled with 800 mm as the changed focal length of the zoom state caused by the operation on the zoom switch 113. When the zoom switch 113 is pressed for a long time, the zoom position of the imaging optical system 105 moves to the telephoto side by one position. At this time, the display unit 154 displays a display 410 using a long arrow labelled with 400 mm as the changed focal length of the zoom state caused by the operation to the zoom switch 113.

Figure 4F:
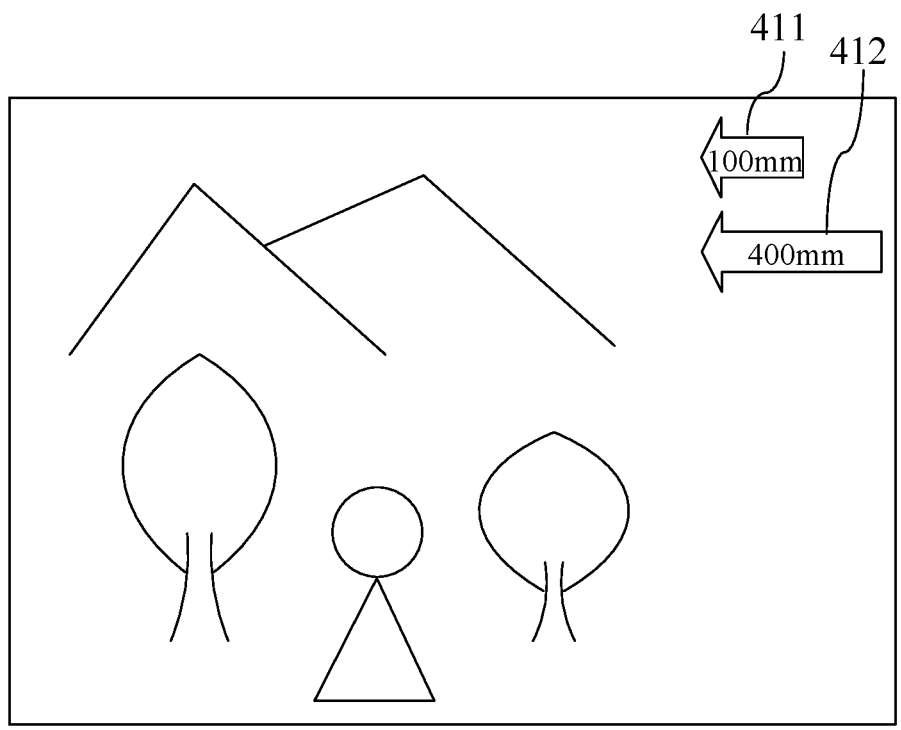

FIG. 4F illustrates an illustrative notice displayed on the display unit 154 when the current focal length is 800 mm. When the zoom switch 113 is pressed for a short time, the zoom position of the imaging optical system 105 moves to the wide-angle end. At this time, the display unit 154 displays a display 411 using a short arrow labelled with 100 mm as the changed focal length of the zoom state caused by the operation to the zoom switch 113. When the zoom switch 113 is pressed for a long time, the zoom position of the imaging optical system 105 is moved to the wide-angle side by one position. Then, the display unit 154 displays a display 412 using a long arrow labelled with 400 mm as the changed focal length of the zoom state caused by the operation on the zoom switch 113.

In the step S308, the controller 101 sets the focal length to the focal length determined in the step S307. The user observes the object at the set focal length.

In the step S309, the controller 101 determines whether or not the user continues to use the image pickup apparatus 1. If the use continues, the flow returns to the step S302, and if the use does not continue, the flow ends.

This embodiment notifies, as the information corresponding to the operation to the zoom switch 113, the operation method of the zoom switch 113 and the changed focal length of the zoom state that occurs when the operation method is executed, but the present invention is not limited to this embodiment. The information corresponding to the operation to the zoom switch 113 may be used to determine how the focal length changes due to the operation to the zoom switch. For example, only the changed focal length caused by the operation to the zoom switch 113 may be notified, information indicating in which direction and by which amount the zoom position moves, or the zoom magnification may be notified. Which of zoom-in or zoom-out is performed may be notified. Instead of the optical zoom, the electronic zoom may be used, or the electronic zoom and the optical zoom may be used together. In that case, the electronic zoom magnification may be converted into the focal length and the changed focal length may be notified. When only one operation method is assigned to one operation member (when clicking and holding down are not distinguished), the effect of notifying the moving amount is small, so only the moving direction of the zoom position may be notified.

This embodiment has described the method of notifying the information corresponding to the operation to the zoom switch 113 using the display unit 154, but the present invention is not limited to this embodiment. For example, the information corresponding to the operation to the zoom switch 113 may be notified using the LEDs 146-149. The speaker 143 and a voice guidance may be used to notify the information corresponding to the operation to the zoom switch 113.

Figure 5:
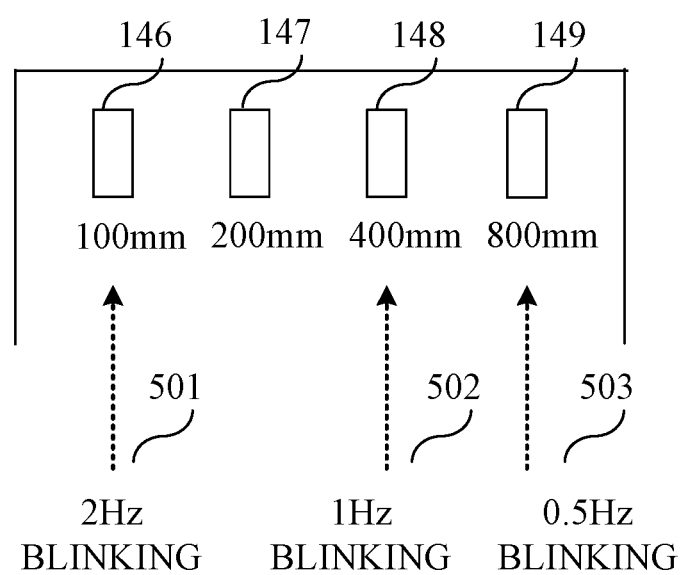
FIG. 5 explains a method of notifying the information corresponding to the operation to a zoom switch using an LED.

FIG. 5 illustrates a method of notifying information corresponding to the operation to the zoom switch 113 using the LEDs 146-149. In FIG. 5, each of the LEDs 146-149 is configured to blink when the focal length is 100 mm, 200 mm, 400 mm, or 800 mm. The blinking cycle of the LEDs 146-149 is set to be longer in order of double-clicking, clicking, and holding down of the zoom switch 113. The following description will discuss the image pickup apparatus 1 set to a default setting and the zoom switch 113 is operated where the current focal length is 200 mm.

When the zoom switch 113 is pressed twice, the zoom position of the imaging optical system 105 moves to the wide-angle side by one position (and the focal length changes to 100 mm), as described above. At this time, as illustrated in a display 501, the LED 146 for the focal length of 100 mm blinks at 2 Hz, which has the shortest blinking cycle.

When the zoom switch 113 is pressed for a short time, as described above, the zoom position of the imaging optical system 105 moves to the telephoto side by one position (and the focal length changes to 400 mm). At this time, as illustrated in a display 502, the LED 148 for the focal length of 400 mm blinks at 1 Hz.

When the zoom switch 113 is pressed for a long time, as described above, the zoom position of the imaging optical system 105 moves to the telephoto end (and the focal length changes to 800 mm). Then, as illustrated in a display 503, the LED 149 for the focal length of 800 mm blinks at 0.5 Hz, which has the longest blinking cycle.

As described above, this embodiment notifies the information corresponding to the operation to the zoom switch 113 using a configuration recognizable by the user, such as the viewfinder, the LED, and the speaker, when there is only one operation member provided to change the focal length. This configuration can determine how the focal length changes according to the operation to the zoom switch 113, and can improve the user friendliness.

This embodiment has discussed changing the state of the image pickup apparatus 1 by changing the focal length using a single zoom switch 113, but the state of the image pickup apparatus 1 may be changed using another single operation member. For example, the state of the imaging device 1 may be changed by changing the ISO speed using a single ISO switch 145. In this case, the information corresponding to the operation to the zoom switch 113 (such as the changed ISO speed caused by the operation to the ISO switch 145) may be notified. Thereby, this configuration can determine how the ISO speed changes according to the operation to the ISO switch 145, and can improve the user friendliness.

The above embodiment can provide an electronic apparatus that can improve the user friendliness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-176707, filed on Sep. 27, 2019, which is hereby incorporated by reference herein in its entirety.

What is claimed is:

1. An image pickup apparatus configured to change a zoom position, the image pickup apparatus comprising:
   an operation member configured to change the zoom position when a first operation is performed; and
   at least one processor which functions as:
   (1) a determiner configured to determine, based on a current zoom position, a zoom changing direction of a direction of zoom-in or zoom-out in which the zoom position is changed when the first operation is performed on the operation member, wherein the determiner determines the zoom changing direction before the first operation is performed on the operation member;
   (2) a changer configured to change the zoom changing direction when the first operation is performed on the operation member to the direction of zoom-in or zoom-out, based on the zoom changing direction determined by the determiner; and
   (3) a notice controller configured to control notice of information corresponding to the zoom changing direction determined by the determiner, before the operation member is operated,
   wherein information corresponding to the zoom-in is information indicating a first zoom position in which a zooming magnification is larger than a zooming magnification of the current zoom position,
   wherein when the determiner has determined that the zoom changing direction is the direction of zoom-in, the notice controller provides, before the operation member is operated, notice of the information corresponding to the zoom-in, and the zoom position is changed from the current zoom position to the first zoom position by performing the first operation,
   wherein information corresponding to the zoom-out is information indicating a second zoom position in which a zooming magnification is smaller than the zooming magnification of the current zoom position, and
   wherein when the determiner has determined that the zoom changing direction is the direction of zoom-out, the notice controller provides, before the operation member is operated, notice of the information corresponding to the zoom-out, and the zoom position is changed from the current zoom position to the second zoom position by performing the first operation.

2. The image pickup apparatus according to claim 1, wherein the operation member changes the zoom position of the image pickup apparatus in accordance with each of a plurality of operations of the operation member,
   wherein before a second operation different from the first operation is performed on the operation member, the determiner determines, based on the current zoom position, the zoom changing direction when the second operation is performed on the operation member, and
   wherein the changer changes the zoom changing direction when the second operation is performed on the operation member, based on the zoom changing direction determined by the determiner.

3. The image pickup apparatus according to claim 2, wherein the plurality of operations include (a) an operation for a time shorter than a predetermined time, (b) an operation for a time longer than the predetermined time, and (c) two operations within a predetermined time interval or less.

4. The image pickup apparatus according to claim 2, wherein the notice controller provides notice including each of the plurality of operations of the operation member and information corresponding to the zoom changing direction when each of the plurality of operations is performed on the operation member, and
   wherein the each of the plurality of operations and the information are associated with each other.

5. The image pickup apparatus according to claim 1, wherein the information indicating the first zoom position is information indicating a focal length longer than a focal length corresponding to the current zoom position, and
   wherein the information indicating the second zoom position is information indicating a focal length shorter than the focal length corresponding to the current zoom position.

* * * * *